Oct. 7, 1930.  A. A. GLIDDEN ET AL  1,777,486
MOLD FOR ELECTRIC CURED TIRES
Filed Nov. 26, 1927    3 Sheets-Sheet 3

Inventors:
Alfred A. Glidden,
Thomas M. Knowland,
Warren R. Dow.
by Charles S. Goodwin, Atty.

Patented Oct. 7, 1930

1,777,486

UNITED STATES PATENT OFFICE

ALFRED A. GLIDDEN, THOMAS M. KNOWLAND, AND WARREN R. DOW, OF WATERTOWN, MASSACHUSETTS, ASSIGNORS, BY MESNE ASSIGNMENTS, TO HOOD RUBBER COMPANY, INC., OF WILMINGTON, DELAWARE, A CORPORATION OF DELAWARE

MOLD FOR ELECTRIC-CURED TIRES

Application filed November 26, 1927. Serial No. 235,849.

This invention relates to a mold for electric cured tires, and has for its object to provide a mold embodying therein a structure of inner and outer mold members so arranged that electric heating units may be interposed therebetween and the heat therefrom transmitted directly to the inner mold members while the outer mold members act to confine and store within the interior of the mold the heat generated by the heating units.

Another object of the invention is to provide a novel arrangement of electric heating units, the same being interposed between the inner and outer mold members in a position where the heat therefrom will be confined within the outer mold members and transmitted directly to the inner mold members.

The invention consists in a mold for electric cured tires as set forth in the following specification and particularly as pointed out in the claims thereof.

Referring to the drawings.

Like numerals refer to like parts throughout the several views of the drawings.

Figure 1:
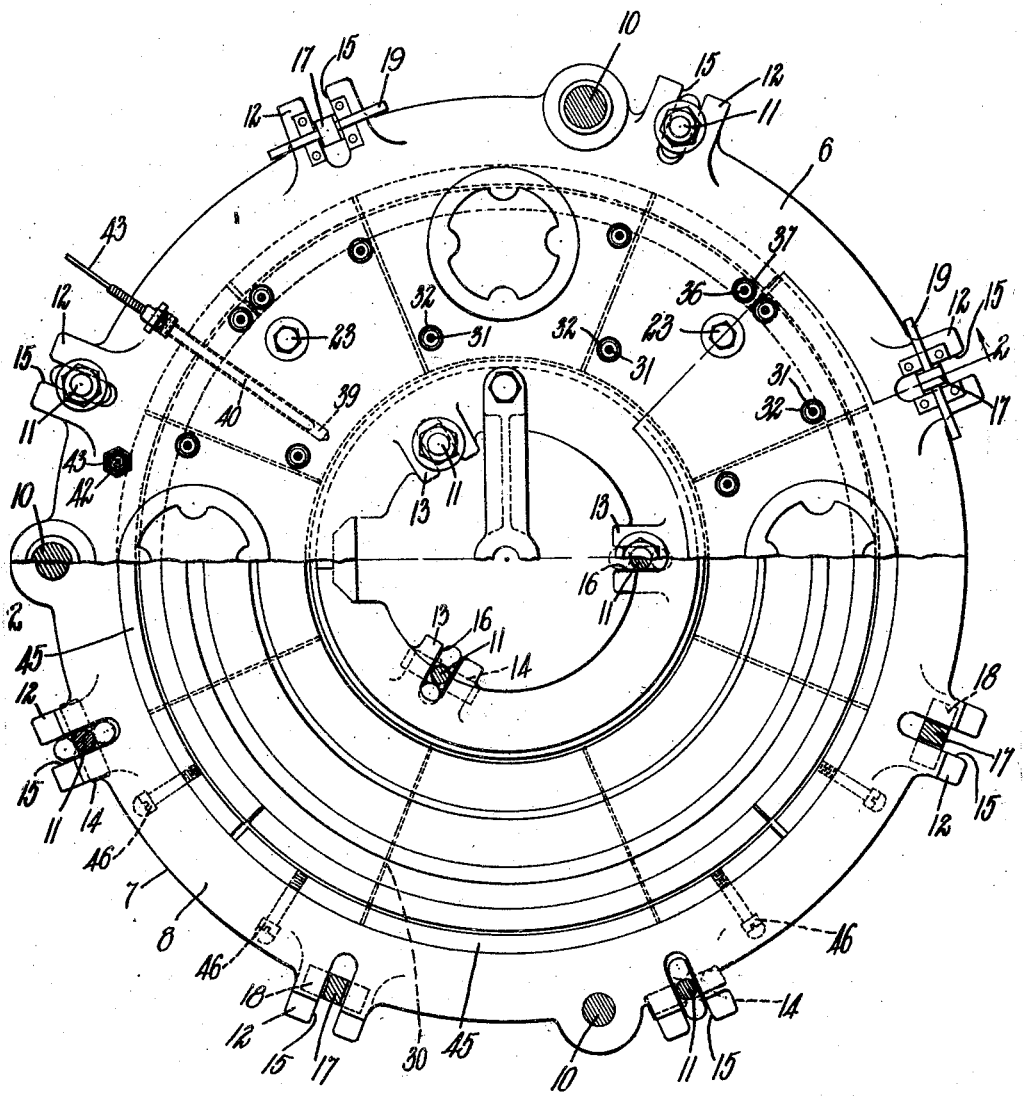
Figure 1 represents a partial top plan view and partial plan view with the top half of the mold removed.

In the drawings, 6 and 7 represent upper and lower outer mold members, said members being oppositely disposed to each other and abutting together at 8. The lower mold member 7 is supported upon a plurality of standards 9 and the upper mold member 6 is mounted upon the lower mold member 7, being movable toward and away from said lower mold member upon a plurality of vertical rods 10 which are rigidly secured to the lower mold member. The upper and lower mold members 6 and 7 respectively are secured together by a plurality of eye bolts 11, certain of said eye bolts co-operating with lugs 12 which are located on the outer circumferential portion of the upper and lower mold members, while other of said eye bolts 11 co-operate with lugs 13 which are located upon the inner portion of the mold members. The eye bolts 11 are all pivotally mounted upon pins 14 which are secured to the under surfaces of the lugs 12 and 13 and when said eye bolts are in clamping position, they are located within slots 15 and 16 of the lugs 12 and 13 respectively.

Other means are also provided for securing the upper and lower mold members together, said means comprising a plurality of wedge bolts 17, each of which embodies therein a head portion 18 which is located beneath the under surfaces of certain of the lugs 12, and said bolts extend upwardly through the slots 15 provided in said lugs and are secured in place by a wedge pin 19 which is driven laterally through an opening provided therefor in the bolt.

Figure 2:
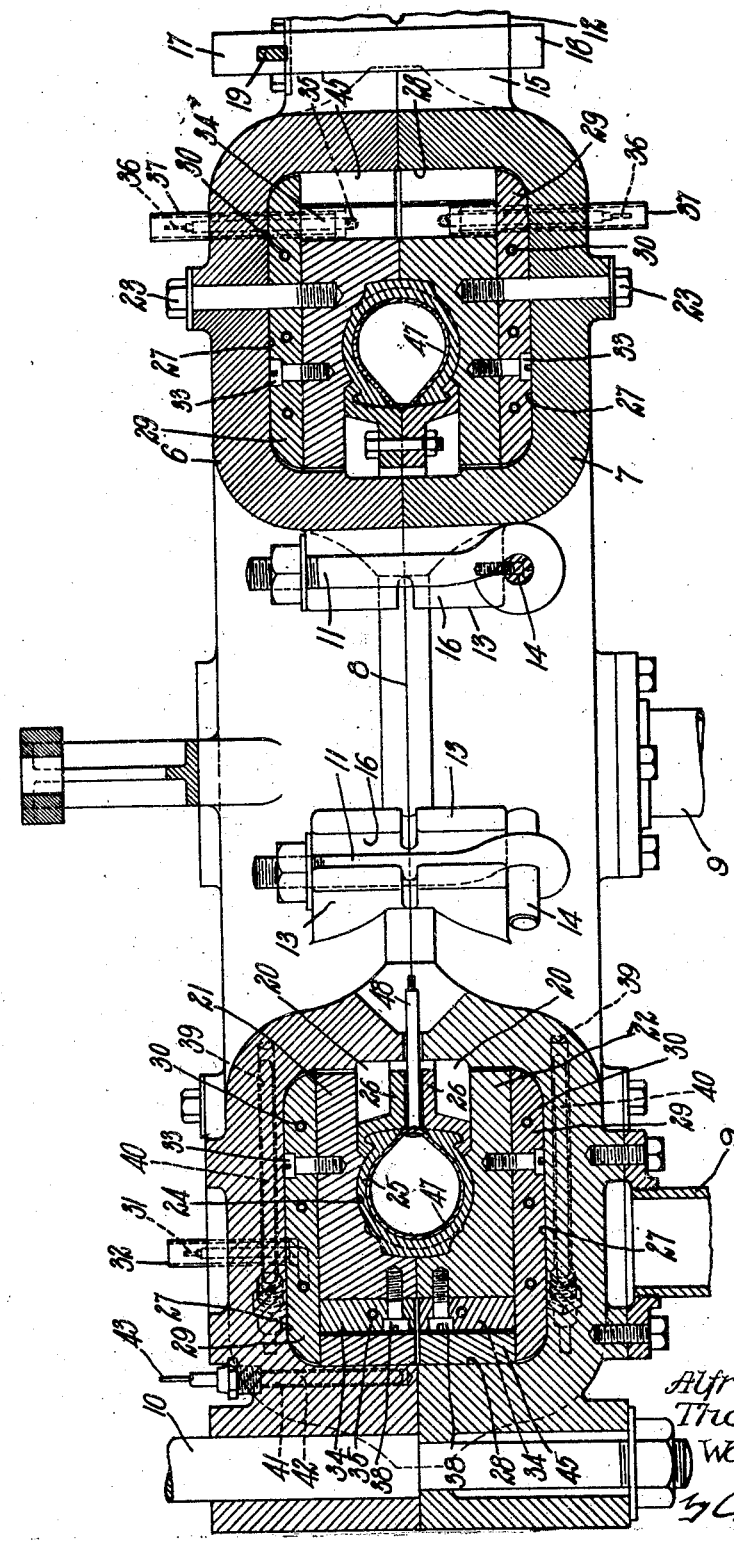
Fig. 2 is an enlarged detail section taken on the line 2—2 of Fig. 1.

The upper and lower mold members 6 and 7 respectively are each provided with an interior cored portion 20, in which upper and lower inner mold members 21 and 22 are located, said mold members being similar in construction and oppositely disposed to each other and abutting together upon the abutting line 8 of the outer mold members. The outer and inner mold members are secured together by screws 23 which extend downwardly from the upper mold member into the inner mold member, and in like manner, the outer and inner lower mold members are secured together by screws 23 which extend from the lower outer mold member into the lower inner mold member. The inner mold members 21 and 22 are cored at 24 to provide a cavity to receive a tire 25, which is to be cured, the inner portion of the tire having bead forming rings 26 secured thereto as indicated in Fig. 2.

Figure 3:
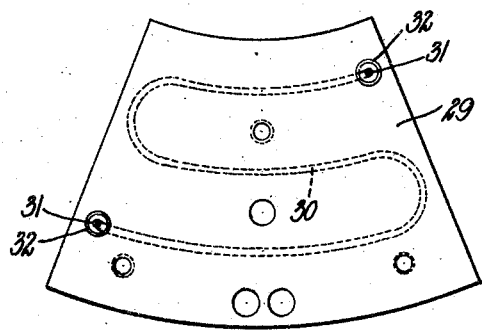
Fig. 3 is a detail plan view of one of the segmental heating units.

Interposed between the adjacent side surfaces of the inner and outer mold members is an annular space 27, and extending around the circumferential portion of the inner and outer mold members is an annular space 28, and these spaces all co-operate to form a U-shaped annular heating space which surrounds three sides of the tire, namely, the opposite side portions of the tire and the outer circumferential or tread portion. Located within the space 27 are a plurality of interchangeable segmental-shaped heating units 29, see Fig. 3, each of which is provided with a heating coil 30 which is cast into the unit in a well-known manner. Terminal portions 31 of the heating coil 30 are located in tubes 32 which project outwardly from the heating units and through openings provided therefor in the outer mold members. The heating units 29 are positioned edge to edge around the space 27 and combine to form an annular heating member for the side portions of the object to be molded. The units 29 are secured by screws 33 to the inner mold members.

Figure 4:
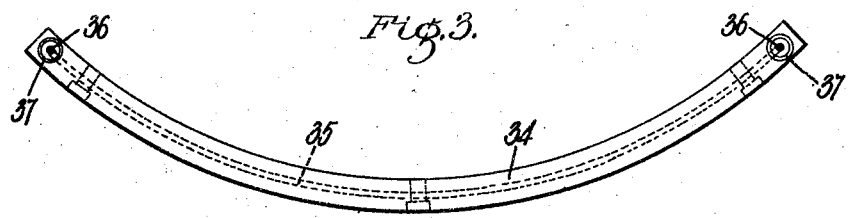
Fig. 4 is a detail plan view of another segmental heating unit.

Located within the space 28 are a plurality of interchangeable segmental-shaped heating units 34, see Fig. 4, each of which is provided with a heating coil 35 having terminals 36 located in tubes 37 which project from said units outwardly through the outer mold members. The heating units 34 are secured to the outer circumferential portion of the inner mold members by screws 38 and said units co-operate to form annular heating members for the outer circumferential portion of the object to be molded.

Figure 5:
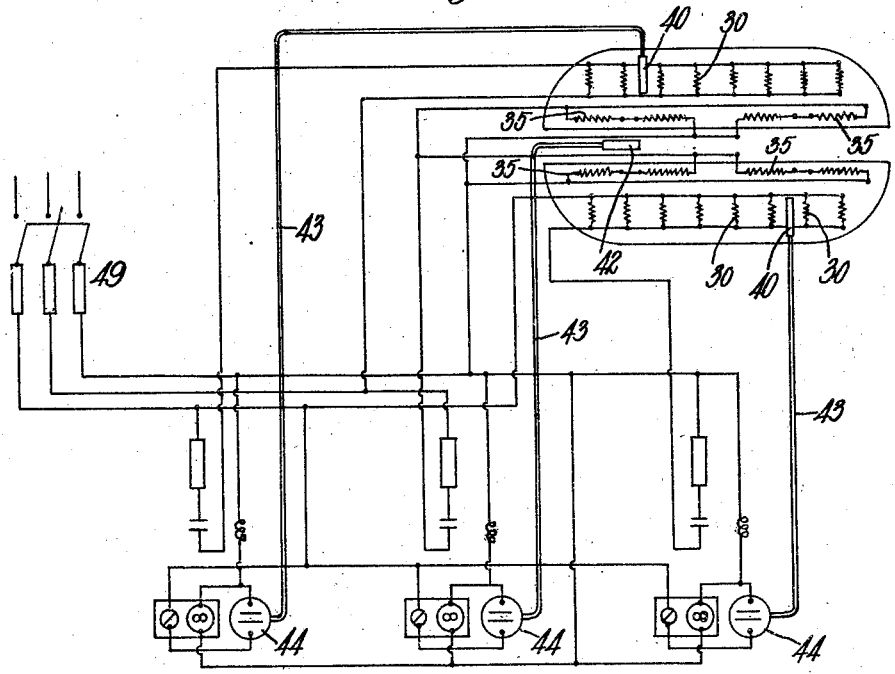
Fig. 5 is a diagrammatic representation of the electric wiring for the heating apparatus.

The terminals 31 of the coils 30 of the upper set of heating units 29 are connected in parallel to an electric circuit as illustrated in Fig. 5, and in like manner the terminals 31 of the coils 30 of the lower set of heating units 29 are connected in parallel to a separate electric circuit. The terminals 36 of the coils 35 of the heating units 34 are also connected in parallel to another electric circuit.

The inner mold members are maintained at approximately an even degree of temperature by electric control mechanisms of well-known construction which are positioned and operated as follows:—Extending inwardly from the outer circumferential portion of the upper and lower outer mold members 6 and 7, adjacent to the segmental heating units 29, are holes 39 in each of which a sensitive member or bulb 40 of well-known construction is located. In like manner another hole 41 containing a sensitive bulb 42 is located within the upper outer mold member 6 adjacent to one of the heating units 34. The bulbs 40 and 42 contain a suitable volatile liquid and are connected by tubes 43 to thermostatic mechanisms 44 of well-known construction in which a Bourdon spring, operated by the expansion of the liquid within the bulbs and connecting tubes, controls the operation of electric contact members, which in turn open and close the electric circuits to the heating units in a manner well known to those skilled in the art.

In order that several sizes of tires may be formed within the mold, the outer mold members 6 and 7 are made of sufficient size to accommodate several different sizes of inner mold members 21 and 22 and when the latter are constructed to receive the smaller sizes of tires, filler or spacer plates 45 are provided interposed between the heating units 34 and the adjacent wall of the outer mold members, and these spacers are secured to the outer mold members by screws 46, see Fig. 1.

An air bag 47 having an air valve 48 is provided for the interior of the tire 25 and is utilized to expand and force said tire against the wall of the cavity of the inner mold member, as will be hereinafter more fully explained.

The general operation of the mold hereinbefore specifically described is as follows:—Assuming that the upper half of the mold is separated a suitable distance from the lower half, a green tire, with the bead forming rings 26 attached thereto and with the air bag 47 therein partly inflated, is placed within the cavity 24 of the lower inner mold member 22. The upper half of the mold is then lowered upon the lower half and bolted together by means of the eye bolts 11 and wedge bolts 17. Air is then admitted to the air bag 47 through the valve 48 until the full curing pressure is obtained. A switch 49 is then operated to supply electricity to the various heating units and the mold is maintained approximately at a uniform temperature by the heat controlling means associated with the various sets of heating units until the tire 25 is vulcanized.

We claim:

1. A mold having, in combination, an inner member in two parts and provided with a core to receive an article to be molded, an outer member in two parts and provided with a core to receive said inner member, a series of removable, interchangeable heating units interposed between the side surfaces of the inner and outer mold members to heat the side portions of the article within the inner member, and another series of removable, interchangeable heating units also interposed between the inner and outer mold members to heat the circumferential portion of the article within the inner member.

2. A mold having, in combination, an inner member in two parts and provided with a core to receive an article to be molded, an outer member in two parts entirely enclosing the inner member and provided with a core to receive said inner member, there being an annular space provided between the inner and outer mold members, and a plurality of removable, interchangeable segmental-shaped heating units located within said space, said units being positioned edge to edge to form a continuous annular heating member.

3. A mold having, in combination, an inner member in two parts and provided with a core to receive an article to be molded, an outer member in two parts and provided with a core to receive said inner member, there being an annular U-shaped space provided between the inner and outer mold members, and a pair of annular heating members each comprising a plurality of segmental units and located within said space between the side surfaces of the inner and outer mold members.

4. A mold having, in combination, an inner member in two parts and provided with a core to receive an article to be molded, an outer member in two parts and provided with a core to receive said inner member, there being an annular U-shaped space provided between the inner and outer mold members and a pair of annular heating members each comprising a plurality of segmental units and located within said space between the side surfaces of the inner and outer mold members, and other annular heating members also located within said space between the circumferential portion of the inner and outer mold members.

5. A mold having, in combination, an inner member in two parts and provided with a core to receive an article to be molded, an outer member in two parts entirely enclosing the inner member and provided with a core to receive said inner member, a plurality of interchangeable, segmental-shaped heating units interposed between the parts of the inner and outer members to heat the article within the inner member, and means to automatically regulate the temperature of the heating means.

6. A mold having, in combination, an inner member in two parts and provided with a core to receive an article to be molded, an outer member in two parts entirely enclosing the inner member and provided with a core to receive said inner member, a plurality of interchangeable, segmental-shaped heating units interposed between the parts of the inner and outer members to heat the article within the inner member, and means to clamp the parts of the outer mold member together with the parts of the inner mold member and heating units located therein.

7. A mold having, in combination, an inner member in two parts and provided with a core to receive an article to be molded, an outer member in two parts entirely enclosing the inner member and provided with a core to receive said inner member, there being an annular space provided between the inner and outer mold members, a plurality of segmental-shaped heating units positioned edge to edge and located within said space and attached to the inner mold members, said heating units forming a continuous heat radiating member between the inner and outer mold members, and means to clamp the parts of the outer mold member together with the parts of the inner mold member located therein.

8. A mold having, in combination, an inner member in two parts and provided with a core to receive an article to be molded, an outer member in two parts and provided with a core to receive said inner member, a plurality of interchangeable, segmental-shaped heating units interposed between the side surfaces of the inner and outer mold member to heat the side portions of the article within the inner member, means to automatically regulate the temperature of said heating means, a plurality of other interchangeable, segmental-shaped heating units also interposed between the inner and outer mold members to heat the circumferential portion of the article to be molded, and means to automatically regulate the temperature of said last-named heating means.

In testimony whereof we have hereunto set our hands.

ALFRED A. GLIDDEN.
THOMAS M. KNOWLAND.
WARREN R. DOW.